United States Patent [19]
Morgan

[11] 3,760,515
[45] Sept. 25, 1973

[54] TREESTUMP REMOVING MACHINE
[76] Inventor: Robert H. Morgan, 3224 W. Lakefield Dr., Milwaukee, Wis. 53215
[22] Filed: Sept. 7, 1971
[21] Appl. No.: 178,316

[52] U.S. Cl. .................. 37/2 R, 144/2 N, 144/34 A, 254/29 R
[51] Int. Cl. ............................................ A01g 23/06
[58] Field of Search .................... 37/2; 144/2 N, 34; 254/29–31

[56] References Cited
UNITED STATES PATENTS
| | | | |
|---|---|---|---|
| 3,557,885 | 1/1971 | Cales | 254/29 R X |
| 3,017,708 | 1/1962 | Gardner | 37/2 R |
| 3,017,707 | 1/1962 | Sigler et al. | 37/2 R |
| 3,427,734 | 2/1969 | Eberhart | 37/2 R |

Primary Examiner—Edgar S. Burr
Assistant Examiner—Clifford D. Crowder
Attorney—Ira Milton Jones

[57] ABSTRACT

A tree stump removing machine consisting of a main frame which is attached to a conventional tractor and has a turret mounted therein to be rotated about a vertical axis by a hydraulic motor that reacts between the main frame and the turret and is powered by fluid pressure derived from the tractor. Both the main frame and the turret have U-shaped openings to receive the trunk of a tree stump to be removed, and the turret has a hinged jaw which is actuated to clamp the trunk to the turret so that upon powered rotation of the turret the trunk is twisted tearing the stump from the ground.

13 Claims, 9 Drawing Figures

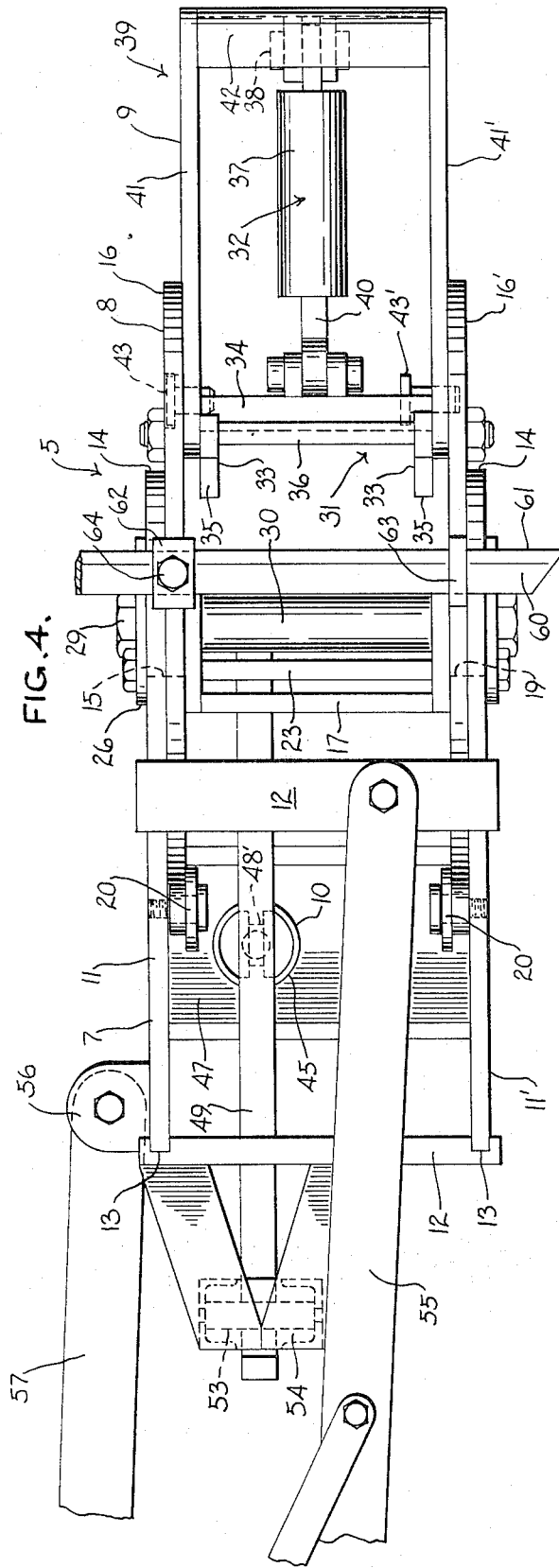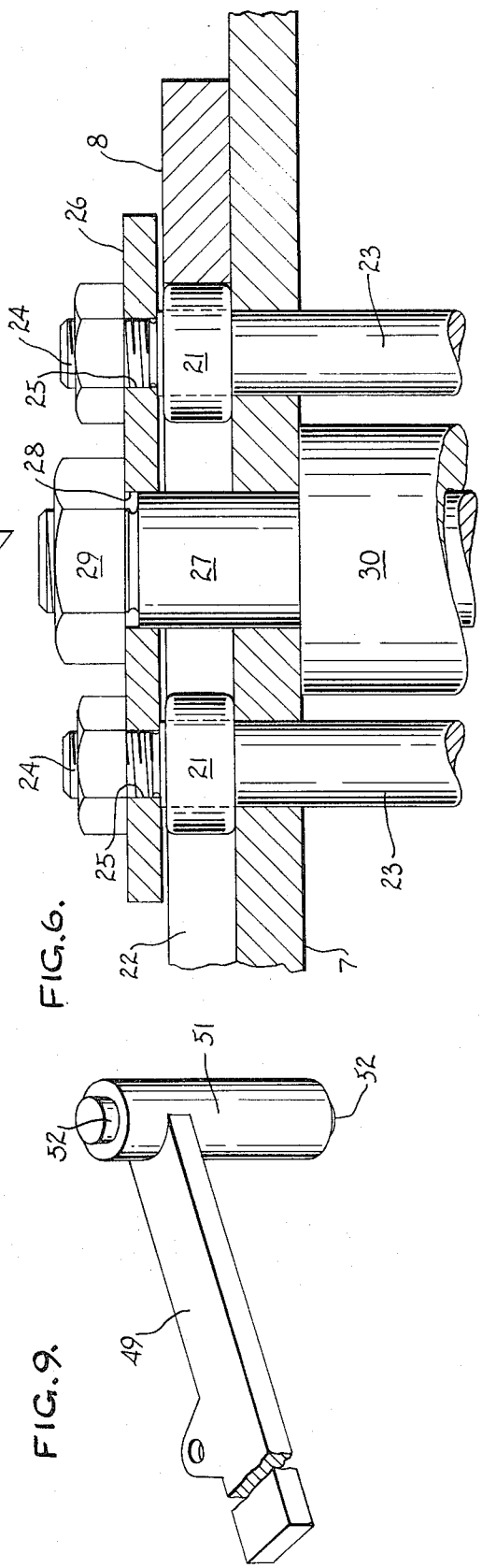

TREESTUMP REMOVING MACHINE

This invention is concerned with the problem of removing trees and tree stumps, and has as its purpose and object to provide a machine by which trees and tree stumps can be uprooted by twisting the trunk.

More particularly, it is an object of this invention to provide a trunk twisting machine capable of attachment to a tractor which has a fluid pressure source that can be used to provide power for the machine.

Another object of the invention is to provide a tree trunk twisting machine that can be built in different sizes to handle a wide range of tree trunk sizes, and which in its larger sizes will be sufficiently powerful to remove tree stumps as large as twenty inches in diameter.

It is also an object of this invention to provide a machine for removing trees and stumps by which the roots radiating from the tree or stump can be cut.

To attain the foregoing objectives, this invention contemplates a machine comprising essentially a main frame that attaches to a conventional tractor such as those employed with farm machinery and various ground working equipment; a turret rotatably mounted in the main frame and adapted to embrace and grip the trunk of a tree or stump to be removed; and power means driven by hydraulic pressure fluid derived from the tractor and reacting between the main frame and the turret to impart trunk twisting rotation to the turret.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of the embodiment of the invention constructed according to the best mode so far devised for the practical application of the principles thereof, and in which:

FIG. 4 is a side view of the machine, but at a larger scale than that of FIG. 1;

FIG. 5 is a detail sectional view through FIG. 2 on the plane of the line 5—5;

FIG. 6 is a detail sectional view through FIG. 2 on the plane of the line 6—6;

FIG. 9 is a perspective view of one of the components of the machine.

Figure 1:
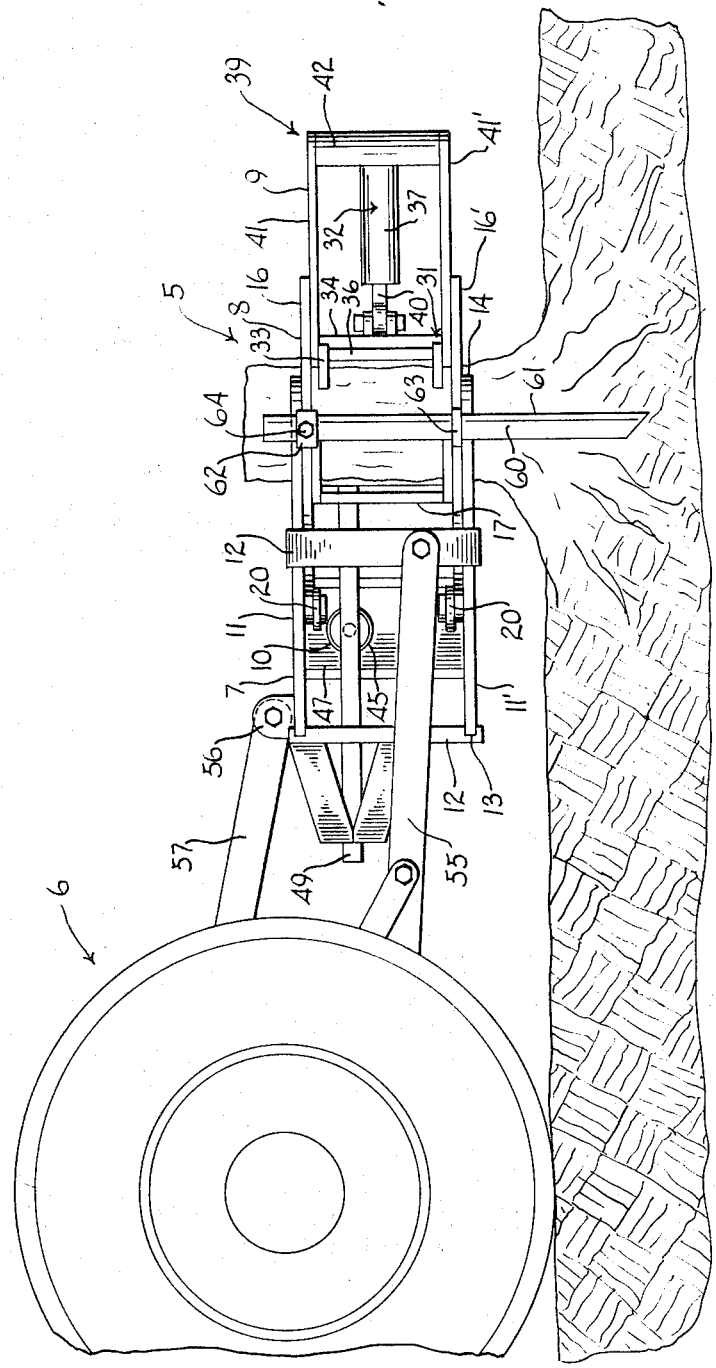
FIG. 1 is a side view of the machine of this invention illustrating the same in its position of use.

Referring to the drawings, the numeral 5 designates generally the entire machine of this invention, which as indicated, is designed to be attached to a conventional tractor 6 partially shown in FIG. 1. The machine comprises a main frame 7, a turret 8 rotatably mounted in the main frame, trunk gripping mechanism 9 on the turret; and turret driving means 10 which is powered by pressure fluid derived from the tractor and which reacts between the main frame and the turret to impart torque to the latter.

The main frame consists essentially of superimposed flat upper and lower horizontally oriented heavy plates 11–11' rigidly connected in spaced apart relation by a plurality of vertical struts or posts 12 welded thereto. These superimposed plates are identical in shape and for convenience in description may be considered as having a straight front edge 13 and a round rear edge 14. A U-shaped opening or recess 15 in the round rear edge embraces the trunk of a tree or stump to be removed.

The turret 8 is received between the rear portions of the upper and lower plates 11–11', and comprises superimposed flat circular discs 16–16' rigidly connected in spaced parallel relationship by a box-like post 17 and an upright wall 18. Like the main frame, the turret has a U-shaped opening 19 extending inwardly from its periphery with the bight thereof concentric to the axis of the turret. The width of this U-shaped opening 19 is the same as that of the opening 15, and the axis about which the turret turns is so located that the bight of both U-shaped openings is concentric to that axis.

To rotatably mount the turret in the main frame, the circular edge of each of its discs 16–16' — which are of the same diameter — has rolling engagement with three flanged rollers 20 that are rotatably mounted on each of the plates 11–11' of the main frame; and to hold the turret in tracking engagement with the rollers 20 a pair of rollers 21 on each disc 16–16' of the turret rides in an arcuate slot 22 in the adjacent main frame plates 11–11'. The arcuate slots are, of course, concentric with the turret axis. As will be obvious, the circular edges of the discs 16–16' provide convex track means on the turret concentric with its axis.

The rollers 22 are journalled on the end portions of shafts 23 (FIGS. 6 and 7) that are received in aligned holes in the discs 16–16' and have reduced diameter threaded extensions 24. These extensions pass through holes 25 in cap plates 26 that are tied together by a tie bolt 27 which passes through aligned holes in the discs 16–16', through the arcuate slots and through a hole 28 in the end caps. Nuts 29 threaded on the end portions of the tie bolt draw the cap plates tightly against the shoulders formed by the reduction in diameter of the end portions of the shafts 23; and since the length of the shafts between these shoulders is somewhat greater than the distance between the top and bottom surfaces of the main frame, the end caps are held spaced from the top and bottom surfaces of the turret. The end caps thus do not interfere with smooth rotation of the turret; and free rotation of the rollers 21 is assured by their being axially shorter than the distance between the end caps and the top and bottom surfaces of the turret.

The tie bolt 27 passes through a spacer tube 30 of a length to fit snugly between the upper and lower discs 16–16' of the turret, so that the tie bolt in conjunction with the spacer tube contributes to the rigidity of the turret.

Figure 2:
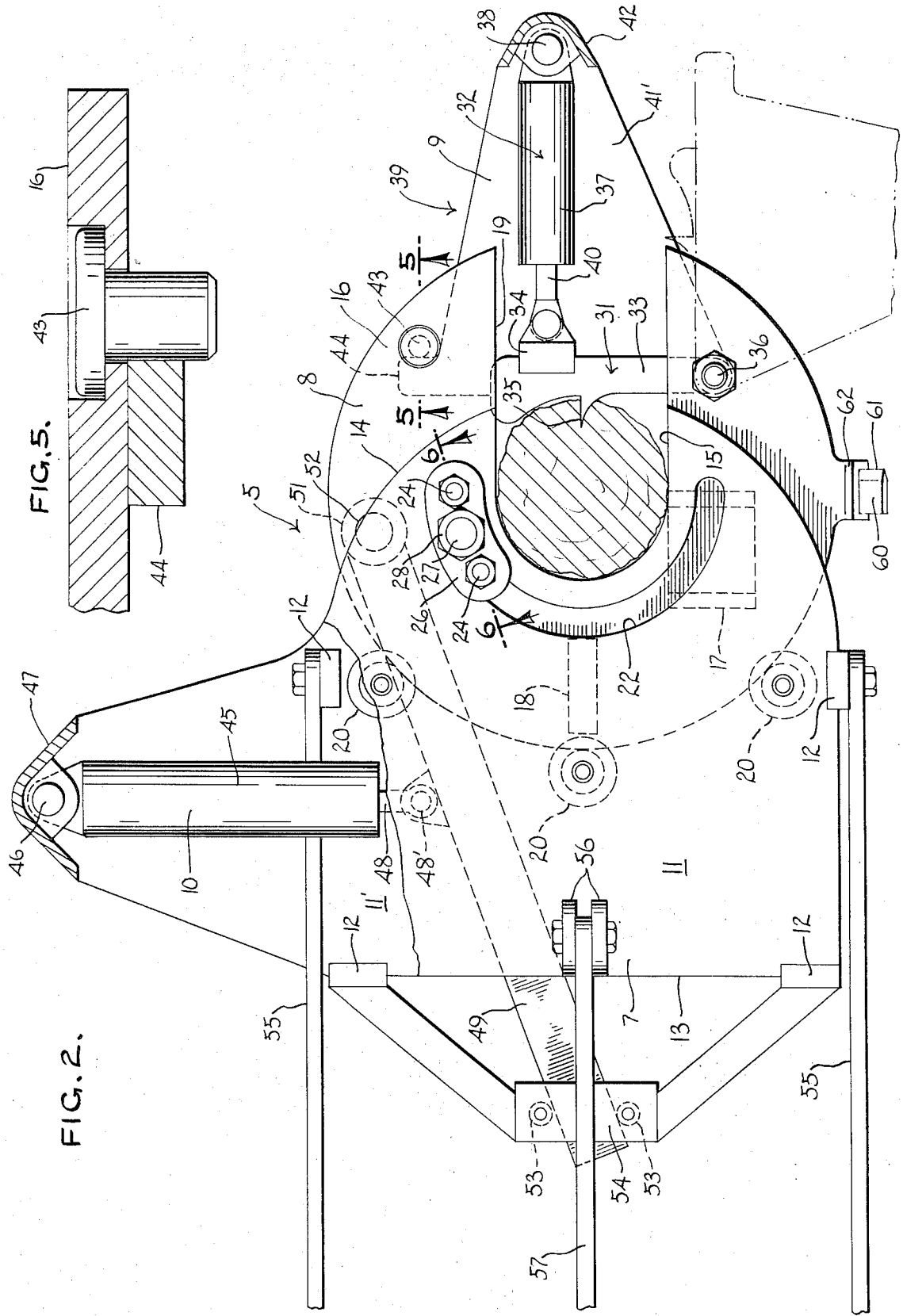
FIG. 2 is a top view of the machine, with parts thereof broken away, and illustrating the same ready to begin twisting a tree stump.

With the turret in the position of rotation in which its U-shaped opening 19 aligns with the U-shaped opening 15 in the main frame — which position is shown in FIG. 2 — the machine can be engaged with a tree trunk or stump to be removed, providing that a clamping jaw 31 with which the turret is equipped is in its inoperative position in which it and its actuator 32 do not block entry into the aligned U-shaped openings.

Figure 8:
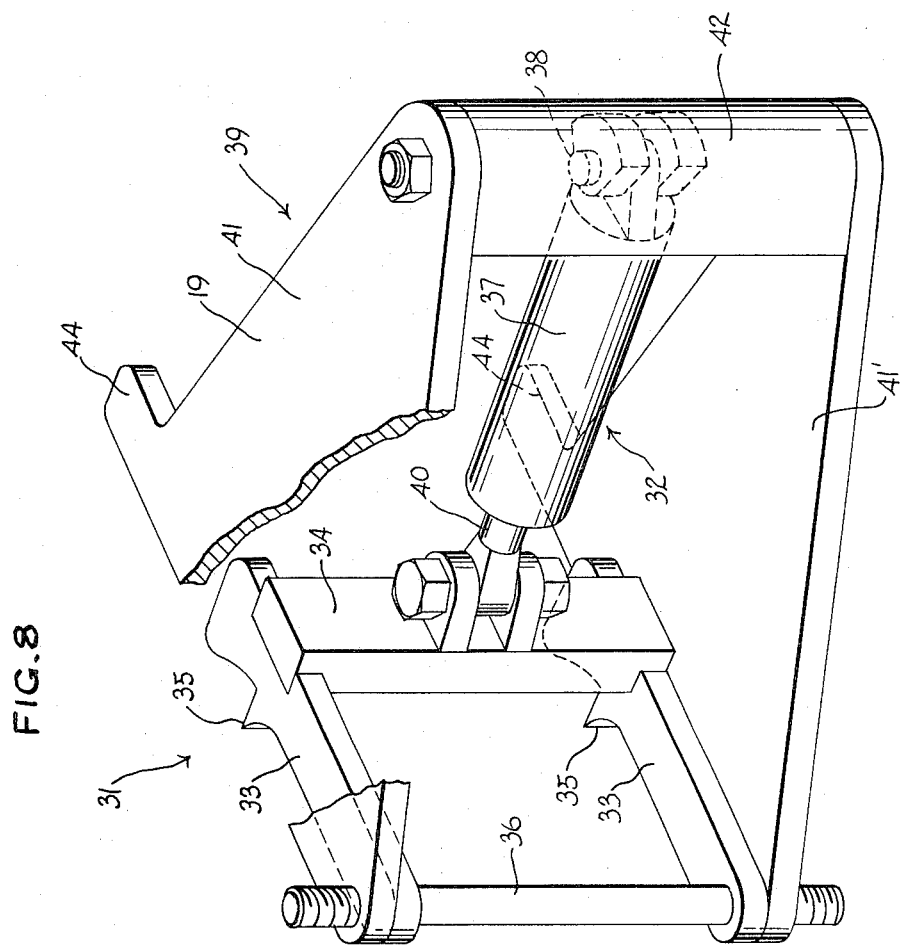
FIG. 8 is a perspective view of the portion of the turret which enables it to grip the tree trunk.

The clamping jaw 31 is best illustrated in FIG. 8, comprises a pair of identical levers 33 that are held in spaced apart aligned relationship by a sturdy cross bar 34 and are shaped to provide teeth 35 which, upon activation of the clamping jaw, bite into a tree trunk received in the bight portion of the aligned U-shaped openings. A pivot pin 36 which passes through aligned holes in the levers 33 and has its ends anchored to the discs 16–16', pivotally mounts the clamping jaw on the turret for swinging motion between its inoperative position clear of the mouth of the U-shaped opening in the turret and its operative position in which its toothed free end portion overlies the bight of the U-shaped opening.

The actuator 32 by which the clamping jaw is forced towards the bight of the U-shaped opening in the turret to clamp a tree trunk therebetween comprises a hydraulic cylinder 37 pivotally connected as at 38 to a gate 39 and having its piston rod 40 pivotally connected to the sturdy cross bar 34 of the clamping jaw. The gate is a rigid weldment consisting of upper and lower triangularly shaped plates 41–41' and a stiff end wall 42 to which the cylinder is connected. The gate fits between the discs 16–16' of the turret and is hinged thereto by the same pivot pin 36 on which the clamping jaw is pivoted. Hence the gate and the jaw can be swung to and from their operative positions as a unit; and to releasably hold the gate in its operative position, headed upper and lower blocking pins 43–43' are dropped into holes in the discs 16–16' behind arms 44 on the plates 41–41'. While these blocking pins are manually insertable in the illustrated embodiment of the invention, power actuated latching means can of course be substituted therefore.

Since the blocking pins must not interfere with the rotation of the turret, the hole in the disc 16 into which the upper pin 43 is inserted is counterbored to receive the head of that pin as shown in detail in FIG. 5.

Rotation is imparted to the turret by actuation of a hydraulic cylinder 45 which is pivotally connected as at 46 to a sturdy crossbar 47 that connects the upper and lower plates 11–11' of the main frame and hence is part of the main frame. The piston rod 48 of the cylinder 45 is pivotally connected as at 48' to a beam 49 pivoted at one end to the turret. The beam 49 — in the present structure — forms the stem of a T shaped forging or weldment shown in FIG. 9, the head 51 of which spans the distance between the discs 16–16' of the turret and has journals 52 projecting from its ends to be received in holes in the discs. The outer end portion of the beam rides between rollers 53 mounted in a bracket 54 that projects from the front end of the main frame and is rigidly secured thereto.

Figure 3:
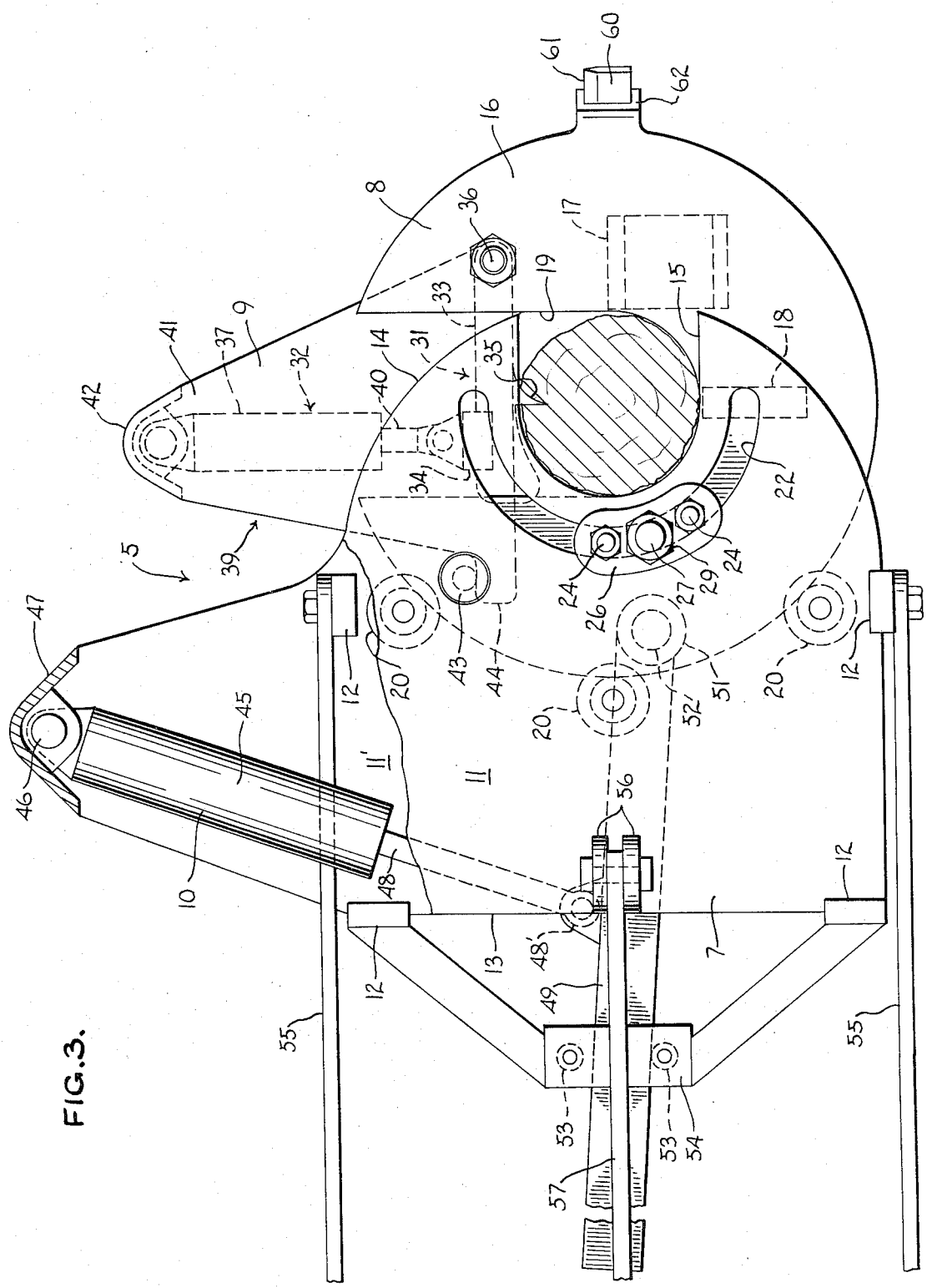
FIG. 3 is a view similar to FIG. 2, but showing the movable parts of the machine in the positions they occupy after the stump has been twisted 90°.

From a comparison of FIGS. 2 and 3, it will be seen that upon projection of the piston in the cylinder 45 from its retracted position shown in FIG. 2 to its extended position shown in FIG. 3, the beam 49 will be moved laterally across the median plane of the machine which contains the axis of the turret and bisects the distance between the rollers 53 and in doing so it will rotate the turret 90°. During this operation, the beam, of course, moves endwise between the rollers 53.

Rotation of the turret twists the trunk of a tree or tree stump in its grasp, but, of course, to have this occur the mainframe must be held against swinging around the trunk. This presents no problem when the machine is attached to a large tractor such as those used in connection with farm machinery and various ground working equipment, and to enable such attachment the posts 12 at the sides of the main frame have provision for the connection thereto of arms 55 that extend from the rear of the tractor (not shown except for a portion of its rear wheels in FIG. 1) and the upper plate 11 of the main frame has a pair of ears 56 projecting upwardly therefrom near its front edge, to provide for the attachment of another arm 57 that also projects from the rear of the tractor. As is well known, these arms constitute part of the mechanism by which different pieces of equipment may be attached to the tractor for transport and for elevation and descent as required during operation thereof.

The tractor, as is customary, has incorporated therein a source of hydraulic pressure to which the cylinders 32 and 45 are connectable to effect gripping and twisting of a tree trunk.

Figure 7:
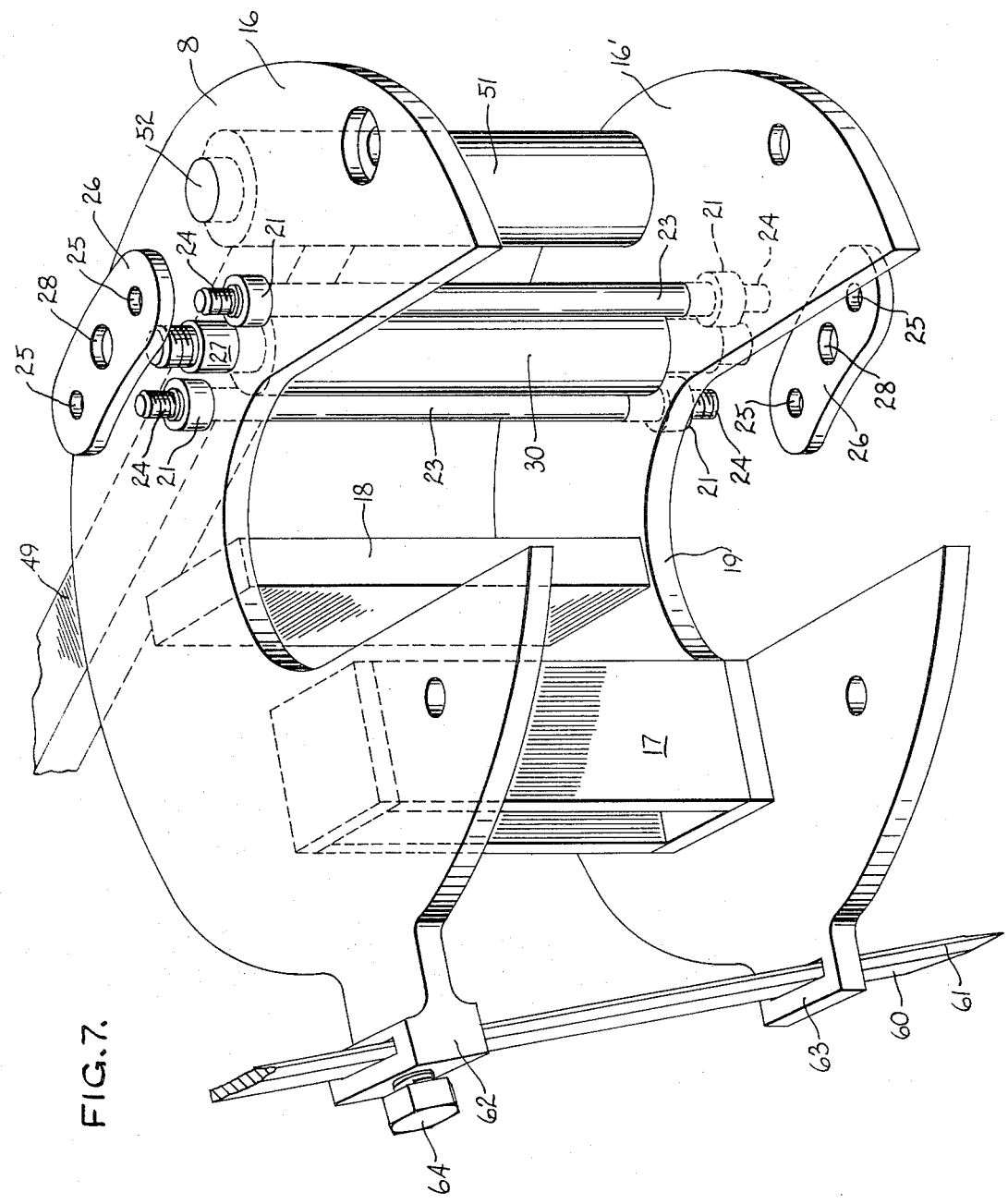
FIG. 7 is a perspective view of the turret of the machine, shown disassembled from the main frame and with parts thereof omitted and others shown detached.

Although not needed on machines intended for the removal of smaller trees and stumps, on the larger sized machines a knife to cut the radiating roots either prior to or during the twisting of the tree trunk or stump, is a valuable adjunct; and, in the machine illustrated, such a knife is provided. It consists of a straight blade 60 having a knife edge 61 at one end portion thereof, mounted on the outer edge of the turret. Specifically, the blade is received in slots formed in lugs 62 and 63 that project from the edge of the upper and lower discs 16–16' of the turret. It is secured against axial displacement in any selected position of adjustment by a sturdy set screw 64 (FIG. 7). Since it is preferable to have the lower cutting edge of the blade travel in a connical orbit that slopes towards the axis of the turret, the upper lug 62 projects farther from the edge of the turret than the lower lug.

OPERATION

With the machine at an appropriate level above ground, and with the turret in its position of rotation shown in FIG. 2, in which its U-shaped opening aligns with that of the main frame, and the clamping jaw 31 and gate 39 in their operative positions, the tractor operator backs the tractor towards the trunk of the tree or stump to be removed and thereby embraces the trunk with the turret (see FIGS. 1 and 2). The gate 39 is then swung shut, i.e. moved to its operative position shown in full lines in FIG. 2. The gate is now "locked" in its closed position by dropping the blocking pins 43 into their respective holes in the turret discs 16–16'. These operations must be performed manually in the machine illustrated, but obviously, the machine could be equipped with power means for doing so.

With the gate "locked" in its closed position, the operator, through appropriate controls (not shown) pressurizes the cylinder 32 to force the clamping jaw against the trunk, causing the teeth on the jaw to bite into the trunk and clamp the trunk against the bight of the U-shaped opening in the turret.

The trunk being thus securely gripped, the cylinder 45 is pressurized to produce a torque reaction between the turret and the main frame, and since the tractor holds the main frame against lateral displacement, the developed torque twists the trunk and literally tears it out by the roots. If the 90° of rotation to which the turret is restricted in the machine illustrated is insufficient to fully loosen the stump, the operator can release the grip the turret has on the stump, bring the turret back to its initial position, take another bite on the trunk and twist it another 90°. When loosened from the ground by this twisting action, elevation of the machine by the hoisting mechanism of the tractor, lifts the trunk from the ground.

If use of the knife to cut the radiating roots, before applying twisting torque to the trunk is deemed desirable, the knife blade is inserted into its holders and driven down into the ground far enough to reach the roots It is secured in this position by the set screw 64, and then the turret is rotated around the trunk, of course, with the clamping jaw swung away from the trunk. Although a complete root cutting operation must be accomplished in 90° stages, the re-positioning of the machine to do so is merely a matter of manipulating the tractor.

Root cutting can also take place simultaneously with the application of trunk twisting torque.

Those skilled in the art will appreciate that the invention can be embodied in forms other than as herein disclosed for purposes of illustration.

The invention is defined by the following claims:

1. A tree stump removing machine comprising:
   A. a main frame;
   B. a turret having a U-shaped opening to embrace a tree trunk or stump, the mouth of said U-shaped opening being at the periphery of the turret and the bight portion thereof embracing the turret axis;
   C. means rotatably mounting the turret in the main frame in a manner leaving the mouth of the U-shaped opening in the turret unobstructed in at least one position of rotation of the turret, so that upon horizontal movement of the main frame towards a tree trunk or stump to be removed while the turret is in said position of rotation, the tree trunk or stump will be embraced by the turret;
   D. trunk clamping means on the turret to engage a portion of a tree trunk or stump embraced by the turret and clamp the same against the bight portion of the U-shaped opening, comprising
     1. a jaw having a gripping portion;
     2. means hingedly mounting said jaw on the turret at one side of its U-shaped opening to swing between an inoperative position in which it does not block entry of a tree trunk or stump into the opening, and an operative position with its gripping portion opposite the bight portion of the opening; and
     3. power means reacting between said jaw and the turret to force the gripping portion of the jaw towards the bight portion of the U-shaped opening and thereby clamp the tree trunk or stump therebetween; and
   E. power means reacting between the turret and the main frame for imparting trunk twisting torque to the turret.

2. The tree stump removing machine of claim 1, wherein the turret comprises
   A. superimposed upper and lower members having aligned U-shaped openings to provide the U-shaped opening of the turret;
   B. knife means in the form of a straight blade that is longer than the distance between the superimposed upper and lower members of the turret and has a sharp edge portion;
   C. slideways on the superimposed upper and lower members of the turret in which said blade is slidably received with its sharp edge portion lowermost for movement to an operative position in which its sharp edge portion projects into the ground, the slideway on the upper one of said superimposed members being farther from the axis of the turret than the slideway on the lower one of said members, so that the knife means points towards the axis of the turret to cut the roots of the tree or stump upon rotation of the turret with the knife means in its operative position; and
   E. securing means to hold the knife means in a selected position of depth and to solidly secure the same to the turret.

3. The tree and stump removing machine of claim 1, wherein the turret comprises super-imposed rigidly connected and aligned but spaced apart U-shaped members, and wherein the jaw of said trunk clamping means is located between said super-imposed members.

4. The tree and stump removing machine of claim 1 wherein said power means that reacts between the turret and said jaw comprises:
   1. a gate hinged to the turret to swing about an axis parallel and contiguous to the hinge axis of the jaw to swing between an open position admitting entry of a tree trunk or stump into the U-shaped opening in the turret and a closed position extending across the mouth of the U-shaped opening;
   2. cooperating retaining means on the turret and the gate for releasably holding the gate in its closed position, and
   3. a fluid pressure cylinder and ram connected between the gate and the jaw.

5. The tree and stump removing machine of claim 18 further characterized by tooth means on at least one of said portions to bite into the tree trunk.

6. The tree and stump removing machine of claim 5 wherein said tooth means is on the gripping portion of the hinged jaw.

7. The tree and stump removing machine of claim 1, wherein said main frame comprises superimposed upper and lower spaced apart rigidly connected members;
   wherein said turret is embraced by said superimposed upper and lower members and has circular track means concentric to its axis; and
   wherein the means mounting the turret for rotation comprises roller means on the superimposed upper and lower members of the main frame in rolling engagement with said circular track means.

8. The tree and stump removing machine of claim 7, wherein said circular track means on the turret is convex; and
   wherein the means mounting the turret for rotation further comprises concave track means on the superimposed upper and lower members of the main frame concentric to said covex track means, and roller means on the turret riding on said concave track means.

9. The tree and stump removing machine of claim 8, wherein the superimposed upper and lower members of said main frame have aligned U-shaped openings extending in from one edge thereof with the bight of said openings substantially concentric to the turret axis; and wherein said concave track means is formed by one edge of an arcuate slot in each of the superimposed upper and lower members of the main frame substantially equi-spaced from the bight of their U-shaped openings and concentric to the axis of the turret.

10. The tree and stump removing machine of claim 7, wherein the turret comprises superimposed upper and lower spaced apart but rigidly connected circular members having aligned U-shaped openings extending inwardly from the periphery thereof to provide said U-shaped opening in the turret, the bight of said openings being substantially concentric to the axis of the turret; and wherein the periphery of said superimposed circular members forms said circular track means.

11. The tree and stump removing machine of claim 10 wherein said means for securing the turret against rotation with respect to the embraced tree trunk or stump comprises:

1. a gate member confined between said superimposed circular members and hinged thereto at one side of the U-shaped opening to swing between an open position admitting entry of a tree trunk or stump into the U-shaped opening and a closed position extending across the mouth of the U-shaped opening,
2. cooperating means on the gate member and said superimposed circular members to hold the gate member in its closed position,
3. a jaw having a gripping portion,
4. means hingedly connecting said jaw with said superimposed circular members for movement between an inoperative position in which it does not obstruct entry into said U-shaped opening and an operative position in which its gripping portion is opposite the bight of the U-shaped opening, and
5. fluid pressure responsive power means connecting the jaw with the gate member and through which movement of the gate member to its open position also carries the jaw to its inoperative position and by which the jaw is forced towards the bight of the U-shaped opening when the gate member is held in its closed position, to clamp a tree trunk or stump therebetween.

12. The tree and stump removing machine of claim 11, wherein the gate member and said jaw have a common hinge axis.

13. The tree and stump removing machine of claim 1, wherein said power means by which trunk twisting torque is imparted to the turret comprises 1. a rigid arm pivotally connected at one end to the turret,
2. a support on the main frame for the free end portion of said rigid arm, said support being spaced from the axis about which the turret turns and accommodating endwise sliding movement of the arm, said arm being at one side of a plane containing the turret axis and bisecting said arm support when the turret is in one position of rotation, and being at the opposite side of said plane when the turret is in another position of rotation, and
3. a cylinder and ram connected between said rigid arm and the main frame to swing said rigid arm from one to the other side of said plane and thereby impart rotation to the turret.

* * * * *

UNITED STATES PATENT OFFICE
CERTIFICATE OF CORRECTION

Patent No. 3,760,515          Dated September 25, 1973

Inventor(s) Robert H. Morgan

It is certified that error appears in the above-identified patent and that said Letters Patent are hereby corrected as shown below:

Column 2, line 40: "rollers 22" should read -- rollers 21 --

Column 4, line 47: "operative positions" should read

-- inoperative positions --

Column 6, line 41 (Claim 5, line 1) "claim 18" should read

-- claim 1 --

Column 6, line 65 (Claim 8, line 7) "covex" should read

-- convex --

Signed and sealed this 19th day of March 1974.

(SEAL)
Attest:

EDWARD M. FLETCHER, JR.          C. MARSHALL DANN
Attesting Officer                Commissioner of Patents